[11] 3,602,571

[72] Inventor Victor J. Norris, Towson, Md.
[21] Appl. No. 780,636
[22] Filed Dec. 3, 1968
[45] Patented Aug. 31, 1971
[73] Assignee Westinghouse Electric Corporation Pittsburgh, Pa.

[54] OPTICAL BEAM SCANNER PROVIDING ANGULAR DISPLACEMENTS OF LARGE BEAM DIAMETERS OVER WIDE FIELDS OF VIEW
7 Claims, 12 Drawing Figs.

[52] U.S. Cl. .................................................. 350/7, 178/7.6
[51] Int. Cl. .................................................. G02b 17/00
[50] Field of Search .................................. 350/6, 7, 199, 285; 178/7.6

[56] References Cited
UNITED STATES PATENTS

| | | | |
|---|---|---|---|
| 3,494,688 | 2/1970 | Rosin et al. | 350/201 |
| 2,997,539 | 8/1961 | Blackstone | 350/7 X |
| 2,976,361 | 3/1961 | Stamps | 350/7 X |
| 3,036,491 | 5/1962 | Schier | 350/7 X |
| 3,408,492 | 10/1968 | Astheimer | 350/7 UX |
| | | | 350/285 X |
| | | | 350/7 UX |
| Re. 19,862 | 2/1936 | Aasit | 350/7 X |

OTHER REFERENCES

Garbuny et al., " Method for the Generation of Very Fast Light Pulses," The Review of Scientific Instruments, Vol. 28, No. 10, Oct. 1957, pp. 826– 827.

*Primary Examiner*—David Schonberg
*Assistant Examiner*—John W. Leonard
*Attorneys*—F. H. Henson, E. P. Klipfel and J. L. Wiegreffe ABSTRACT: Described is an optical beam scanner capable of transmitting large beam diameters over wide fields of view at high scan rates. In certain embodiments of the invention, this is accomplished by focusing an incident beam on a rotating optical assembly in such a manner that the beam is collimated and deflected through an angle that is the sum of the angle subtended by an individual optical element of the assembly and the angle that develops due to the varying off-axis position of the beam with respect to the optical element. In another embodiment, somewhat the same effect is achieved, but without the generation of refractive angles, by varying the position of the optical element such that its axis is always coincident with the axis of an incident beam.

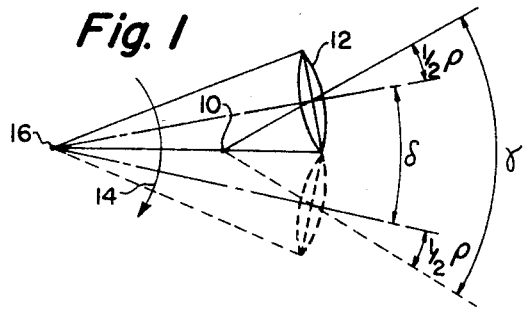
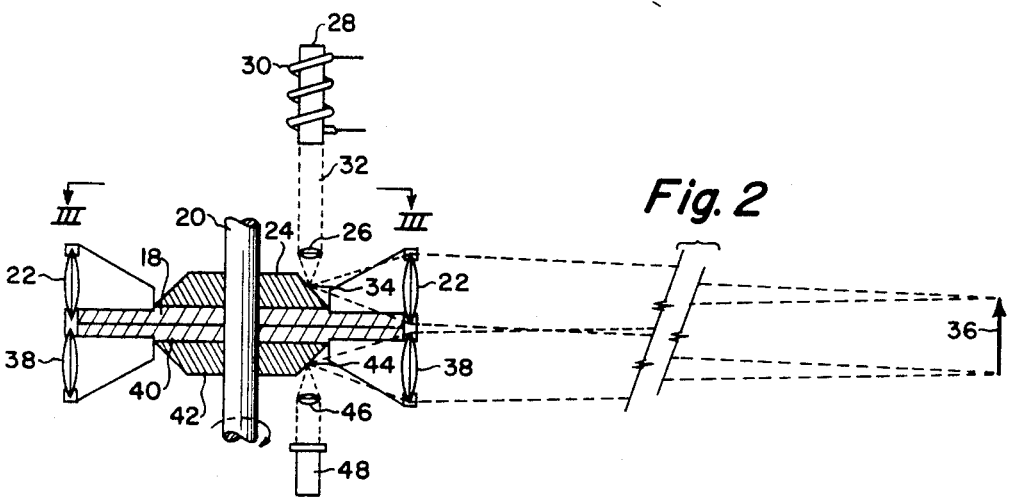
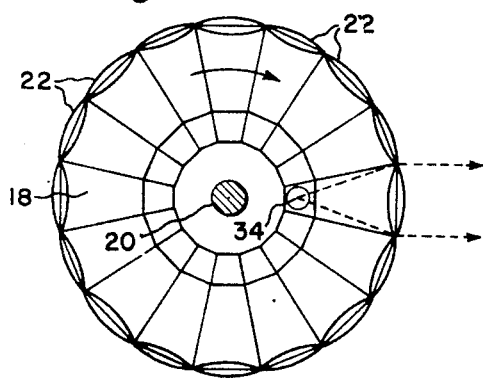
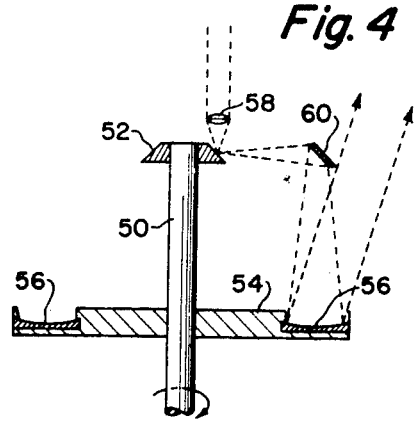
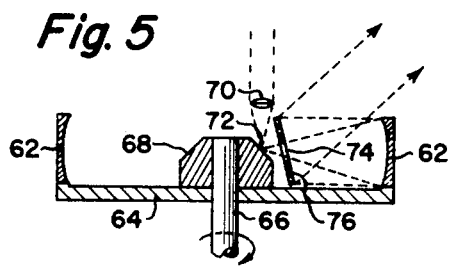
INVENTOR.
VICTOR J. NORRIS, JR.
BY Ernest P. Keyfel
ATTORNEY

OPTICAL BEAM SCANNER PROVIDING ANGULAR DISPLACEMENTS OF LARGE BEAM DIAMETERS OVER WIDE FIELDS OF VIEW

CROSS-REFERENCES TO RELATED APPLICATION

Copending application Ser. No. 780,658, filed Dec. 3, 1968 and assigned to the assignee of the present application.

BACKGROUND OF THE INVENTION

As is known, present optical beam scanning devices consist of either optically active elements whose indices of refraction vary with time or reflective elements such as mirrors or lenses that are mounted on members whose positions vary with time. In the former case, the indices of refraction are usually varied by means of electrical signals; whereas, in the latter case, the position of reflective elements are varied with time by means of a mechanical assembly.

The essentially static operation and high scan rates that the electro-optic and optoacoustic refractive scanners offer are offset by the small angles that are developed, the beam distortion that is introduced, and the maximum beam size that can be transmitted. The scan angle is limited by the extent to which the refractive index of an optical medium changes due to an applied electric field or mechanical force. The beam size and distortion are constrained by the diameter of the cross section of the optical medium over which a constant index of refraction can be maintained for a given time. These factors combine with others to limit the number of resolution elements that can be generated per scan.

Mechanical reflective scanners do not impose the limitations of electro-optic and optoacoustic refractive scanners. However, the scan rate for a given beam diameter and field of view is limited by the mechanical considerations involved in a rotating mass. The facets of rotating polygons constitute the reflecting elements in most wide-angle mechanical scanners. To realize a high angular scan efficiency (i.e., the ratio of the actual angle scanned to the angle subtended by each facet) the number of beam diameters per facet length is made large. However, since the diameter of the polygon is directly proportional to this latter value, polygon sizes exceed tolerable dynamic limits in mechanical scanners. As a consequence, either the scan angle or rate of scan must be sacrificed.

SUMMARY OF THE INVENTION

As one object, the present invention seeks to provide a new and improved optical scanning system which overcomes the disadvantages of present mechanical, electro-optic and optoacoustic scanning systems.

More specifically, an object of the invention is to provide a new and improved optical scanning system employing a rotating member having a plurality of optical elements spaced around its periphery, together with a truncated pyramid at the center of the rotating member having facets which direct a beam of light through successive ones of the optical elements as the member rotates.

Another object of the invention is to provide a mechanical optical beam scanner which permits the projection of large beam diameters over wide fields of view by virtue of an off-axis positioning of an incident beam with respect to optical elements and the resultant generation of refractive angles.

Still another object of the invention is to provide a mechanical optical beam scanning system in which the field of view can be varied to suit requirements.

In accordance with the invention, an optical scanning system is provided including a rotating disc having spaced around its periphery a number of lenses or spherical mirrors in side-by-side relationship. A pyramid that has the same number of facets as there are optical elements is located in the center of the disc and rotates therewith. Each facet is located at the focal point of its associated lens or mirror; while the beam to be scanned is focused on one of these reflective facets. The facet redirects the beam to its companion lens; and as each lens rotates through the angle it subtends, it collimates the beam and deflects it over this same angle.

In certain embodiments of the invention, the axis of each optical element is fixed and extends along the radius of the disc. With this arrangement, the principal axis of the lens is initially on one side of the beam, then coincident with it, and finally on the far side of the beam. Consequently, an additional angle is developed as a result of the off-axis position of the beam; and the direction of this angle is such that it magnifies the rotational angle generated. In another embodiment of the invention, the axis of each optical element is coincident with the axis of an incident beam at all times, facilitating the generation of scan angles that are considerably larger than the equivalent refractive angle that is permissible.

Appropriate combinations of these refractive and rotational methods of angular scan generation permit the projection of large beam diameters over wide fields of view. The required diameters of the scanner assemblies are less than those required for polygons having comparable performance characteristics.

In one embodiment of the invention, means are provided for doubling the scanning rate of an optical scanner of the type described above while maintaining the rotational speed of the aforesaid rotating disc constant and while decreasing the field of view only slightly. This is achieved by rotating the incident beam in a direction opposite that of the scanner assembly; and although such a configuration cuts in half the rotational angle that is normally developed, the refractive angle generated is preserved.

Still further in accordance with the invention, means are provided for varying the scanning angle of an optical scanner of the type described above by means of a second truncated pyramid which rotates with the first and directs a light beam, through a movable mirror, onto the first truncated pyramid.

The above and other objects and features of the invention will become apparent from the following detailed description taken in connection with the accompanying drawings which form a part of this specification, and in which:

FIG. 1 illustrates the manner, in accordance with the invention, in which two angles are generated in concert to form a field of view that is the sum of the two;

FIG. 2 depicts a typical configuration of the scanner of the invention wherein lenses are employed as the optical elements;

FIG. 3 is a top view of the scanner of FIG. 2 taken substantially along line III—III of FIG. 2;

FIG. 4 is an embodiment of the invention, similar to that of FIG. 2, but employing spherical mirrors as optical elements and incorporating means for deflecting the beam in a nonradial direction prior to its striking the spherical mirror component;

FIG. 5 is another embodiment of the invention similar to that of FIG. 2 but wherein the lenses of FIG. 2 are again replaced by spherical mirrors;

Figure 6:
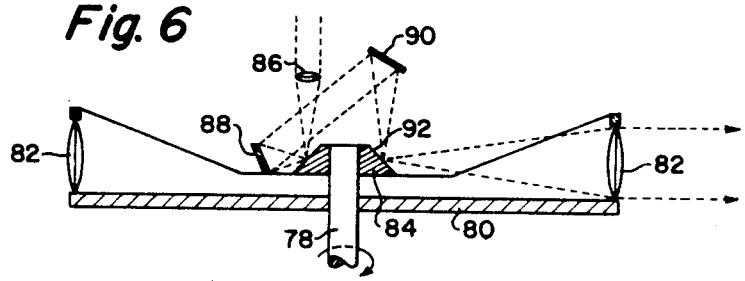
FIG. 6 illustrates an embodiment of the invention wherein the scanning rate can be doubled by the use of a counter-rotating incident beam.

With reference now to the drawings, and particularly to FIG. 1, the point 10 represents the location of a stationary point light source located in the focal plane of a lens 12 which moves in the direction of arrow 14 from the full-line position shown to the lower dotted line position. δ indicates the angle through which the beam from source 10 is deflected as the lens 12 rotates through the angle it subtends in rotating about axis 16. ρ indicates the angle through which the beam is refracted by virtue of its initial and final off-axis positions. γ, therefore, is the total angle scanned by the beam; and it will be readily appreciated that this angle is substantially larger than the angle traversed by the lens 12 about the axis 16. Thus, it can be seen that the angle γ through which the beam is deflected is the sum of the angle subtended by the lens 12 and the angle that develops due to the varying off-axis position of the beam with respect to the lens. As will be seen, the lens 12 can be replaced, for example, by means of spherical mirrors.

With reference now to FIGS. 2 and 3, a typical configuration of the scanner is shown wherein lenses are employed as the optical elements. The system includes a table or disc 18 secured to a central shaft 20 and rotatable therewith. Circumferentially spaced around the periphery of the disc 18, on the top thereof, is a plurality of lenses 22, each having an axis extending through the central axis of the shaft 20, as perhaps best shown in FIG. 3. Also mounted on the disc 18 and concentric with the shaft 20 is a truncated pyramid 24 having a plurality of reflecting surfaces or facets corresponding to the number of lenses 22, the arrangement being such that a beam of light directed against the facets will be reflected through the lenses 22.

Above the pyramid 24 is a stationary lens 26; and above the lens 26 is a laser rod 28 surrounded by a flash tube 30. As will be appreciated, the laser rod is formed from paramagnetic material; and upon excitation by the flash tube 30 is capable of producing a beam 32 of monochromatic light which is focused by the lens 26 into a spot 34. This light spot, when it passes through a lens 22, is directed onto a distant object 36. The reflected light passes through one of a plurality of lenses 38 circumferentially spaced around the periphery of a lower disc 40, also provided with a truncated pyramid 42 having a plurality of reflecting facets or surfaces. The light, after being focused into a point 44 on a facet of the truncated pyramid 42, is directed through stationary lens 46 onto a photosensitive device, such as a photomultiplier 48.

It will be appreciated that the assembly just described comprises an electro-optics scanning system wherein a light beam is caused to scan across a single line of the distant object 36 through an angle corresponding to the angle γ in FIG. 1 each time the shaft 20 and discs 18 and 40 rotate through the smaller angle δ. As each facet of the truncated pyramid passes beneath the stationary lens 26, the light spot 34 will intersect the lower edge of each facet as viewed in FIG. 3, and then travel across the facet to the upper edge. In this process, the associated lens 22 will have rotated through 22.5°; however, the beam passing through the lens will have rotated through 22.5° plus the angle ρ which is the angle through which the beam is refracted by virtue of its initial and final off-axis positions as explained in connection with FIG. 1.

The reflected light from object 36 passes through the lens 38 in the opposite sense; however here again the scanning angle is materially increased by virtue of refraction of the beam due to its initial and final off-axis positions. The f-numbers and focal lengths of the input lenses and the output lenses are chosen such that the output beam may be collimated to the desired degree. Furthermore, additional reflecting surfaces may be employed between the pyramid facets and the output lens to deflect the beam in a nonradial direction for a portion of the focal length. Such an arrangement allows raising the f-number of the output lenses without necessitating corresponding increases in the radius of the assembly.

As will be understood, a beam 32 of coherent light from a laser is preferred since such a beam has very little divergence. However, ordinary polychromatic light can be used if the divergence of the beam can be tolerated.

FIGS. 4 and 5 illustrates two scanner versions that may be employed where the lenses 22, for example, are replaced by spherical mirrors as the output optical elements. The embodiment of FIG. 4 again includes a rotatable shaft 50, a truncated pyramid 52 having a plurality of reflective facets, and a disc 54 carried on the shaft 50 and rotatable therewith. In this case, spherical mirrors 56 are circumferentially spaced around the periphery of the disc 54, the mirrors 56 corresponding to the lenses 22 of the embodiment of FIGS. 2 and 3. Incident light is focused through stationary lens 58 onto the facets of the rotating truncated pyramid 52, and then onto a stationary mirror 60 where the light is reflected down onto the spherical mirrors 56. Upon reflection from the mirrors 56, the beam is collimated and directed out of the plane of the rotating disc 54. This configuration permits small diameter assemblies with large f-number mirrors (or lenses) in addition to allowing greater flexibility in the design of the mechanical structure.

The embodiment of FIG. 5 again employs spherical mirrors 62 circumferentially spaced about a disc 64 mounted on a rotatable shaft 66 and having a truncated pyramid 68 mounted thereon. A beam of light passing through a stationary lens 70 is focused into a point 72 at the reflecting facets of the pyramid 68, then through an opening 74 in a stationary mirror 76 and onto one of the spherical mirrors 62. From the mirrors 62 the light is reflected back onto the stationary mirror 76 and then out of the plane of the rotating assembly.

From the foregoing, it can be seen that the maximum beam size that can be transmitted is determined solely by the diameter of the individual lenses or mirrors that collimate the incident beam. The number of resolution elements that can be generated per scan is substantially higher than that achieved with optically active elements, being limited by the distortion introduced by off-axis operation. For typical scanner parameters, its use can yield either larger scan angles or assemblies that are smaller in diameter and rotate at slower rates. These improved mechanical parameters can be realized since an angular scan efficiency greater than one is attained with only one beam diameter per facet as opposed to a typical efficiency of 0.75 for a polygon that utilizes two-beam diameters per facet.

Figure 7:
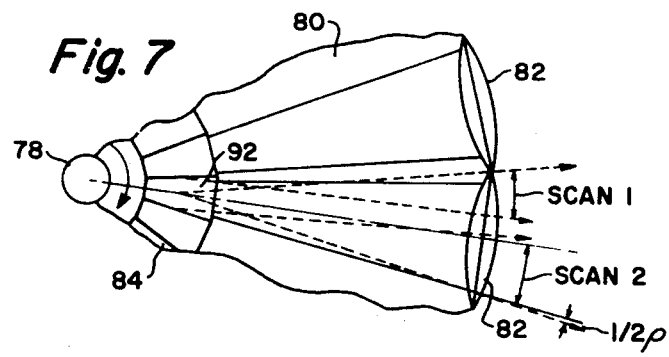
FIG. 7 is a top view of the embodiment of FIG. 6.
Figure 8:
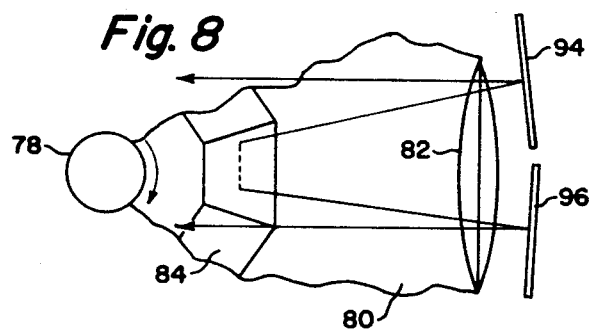
FIG. 8 illustrates an embodiment of the invention, similar to that of FIG. 6 but employing mirrors for reflecting one scan directly over another.

As will be appreciated, the scanning rate of the embodiment of the invention shown in FIGS. 1–5 is directly proportional to the revolutions per minute of the rotating mass on which the mirrors or lenses are rotated and inversely proportional to the scanner field of view. For a given field of view, the revolutions per minute are limited by the mechanical considerations involved in a rotating mass. A system for doubling the scanning rate while maintaining the revolutions per minute constant and decreasing the field of view only slightly is shown in FIGS. 6–8. It involves rotating the incident beam in a direction opposite to that of the scanner assembly; and although such a configuration halves the rotational scanning angle that is normally developed, the refractive angle generated is preserved.

FIG. 6 illustrates a typical configuration that may be used to realize a counter-rotating beam optical assembly. It again includes a rotatable shaft 78 having a disc 80 mounted thereon, and mirrors 82 circumferentially spaced around the disc 80. Also mounted on the shaft 78 is a truncated pyramid 84 having reflecting facets and corresponding to the truncated pyramid 24 of FIG. 2. The collimated incident beam in this case is passed through a stationary lens 86 and directed to a point on a facet of the rotating truncated pyramid 84 that is opposite the point being used to develop the scan angle on the other side of the disc 80. Upon reflection from the initial facet, the beam is directed by means of two stationary mirrors 88 and 90 to the facet on the other side of the pyramid 84. As a result of the first reflection, the direction of rotation of the beam is now counter to that of the scanning facet. That is, assuming that the shaft 78 is rotating in a clockwise direction as viewed in FIG. 7, the beam directed onto the facet 92 by mirror 90 is rotating in the opposite direction. The focal length of the input lens 86 is chosen such that the beam is focused on this scanning facet 92. The length of the arc described by the beam is equal to the chord of the angle subtended by the corresponding lens 82 at its focal plane.

Due to the opposing motions introduced, the focused beam passes completely through the angular segments of two optical elements each time it passes over one of the initial reflecting facets. As the cycle repeats, each output angular segment is used twice. The consequent doubling of the effective number of elements per revolution is offset by the requirement that the number of degrees initially allocated for each optical element must be double that which is actually desired for rotational angle generation. FIG. 7 shows the scan pattern that is generated during each cycle. The overlapping of the scan angles of adjacent optical elements that might be expected is not realized. Note that each lens 82, in effect, is used twice as it rotates past the incident light beam directed downwardly from the stationary mirror 90.

Since the scan patterns do not overlap, separate mirrors 94 and 96 shown in FIG. 8 may be used to reflect one scan directly over the preceding one. Since the separation between mirrors is so small, both patterns appear to originate from the same source. Thus, the embodiment of FIGS. 6–8 provides a means for doubling the scan rate of the system of FIGS. 1–5, for example, without increasing the speed of the rotating mass.

Figure 9:
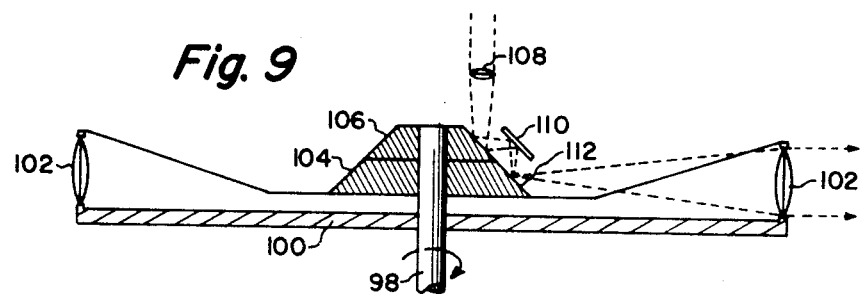
FIG. 9 illustrates an embodiment of the invention for underscanning wherein the field of view of the beam is reduced.
Figure 10:
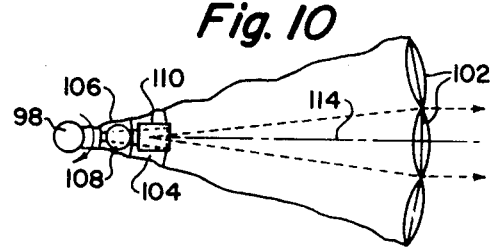
FIG. 10 is a top view of the embodiment of FIG. 9.

A means to scan over a smaller field of view and at slower rate than is normal (i.e., underscan) is a desirable capability of wide-angle optical beam scanners such as that shown in FIGS. 1–5. Such a feature provides better definition and increases the energy incident on each resolution element. A means for underscanning by the addition of a second pyramid to the scanner shaft of the embodiment of FIG. 1 is illustrated in FIGS. 9 and 10. In this embodiment, a rotating shaft 98 is again provided which carries a disc 100 having a plurality of optical elements, such as lenses 102, circumferentially spaced around its periphery. In this case, two truncated pyramids 104 and 106, one above the other, are carried on the shaft 98 and rotate therewith. The two pyramids are arranged such that a light beam incident upon the upper pyramid 106 will be deflected to the lower pyramid at a point where the principle axis of the output element and the facet of the pyramid intersect. As the entire assembly rotates, the beam will always be located on the principle axis of the output element. Thus, an incident beam passing through a stationary lens 108 is directed onto a facet of the upper pyramid 106, then directed to a stationary mirror 110 and finally to a facet 112 of the lower pyramid 104. From this lower facet 112, the light is deflected through the lens 102. The mirror 110 is stationary such that the beam will always be located on the principle axis 114 (FIG. 10) of the output lens 102 and will not sweep across the facet as in the embodiment of FIGS. 1–5. Consequently, the conditions required for generation of a refractive angle as shown in FIG. 1 are not satisfied, and only the rotational angle is generated and is scanned in the same time period as is normally used to generate both the refractive and rotational angles.

Figure 11:
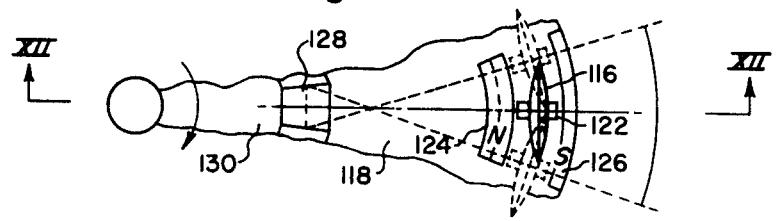
FIG. 11 illustrates an embodiment of the invention wherein the axis of the output optical element is at all times coincident with the incident beam.
Figure 12:
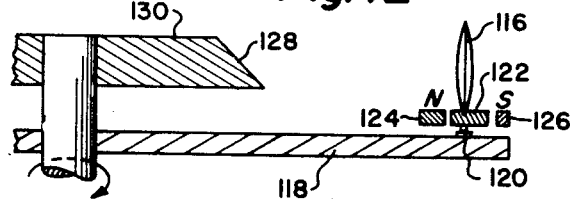
FIG. 12 is a cross-sectional view taken substantially along line XII—XII of FIG. 11.

FIGS. 11 and 12 illustrate another embodiment of the invention wherein the axis of the output optical element is coincident with the incident beam throughout the entire scan angle; however in this case the axis of the output optical element is caused to physically rotate. In this case, a lens 116 is pivotally mounted on a rotating disc 118 by means of a pin 120. Secured to the pin 120 is a magnetically permeable pole piece or rotor 122 which passes between stationary arcuate magnets 124 and 126 disposed at either end of the pole piece 122 to provide north and south magnetic fields extending along arcuate paths at either end of the pole piece. With this arrangement, the pole piece 122 will continually attempt to align itself with the magnetic lines of flux; and as it does so the lens 116 will rotate about the axis of pivot pin 122 to maintain the axis of the lens coincident with the incident beam from a facet 128 of the rotating truncated mirror 130 mounted on disc 118.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. In an optical scanning system, a rotating disc, a plurality of senses carried on said disc and spaced around its periphery in side-by-side relationship, pyramid means at the center of said disc and operatively connected thereto so as to rotate therewith, the sides of said pyramid means defining a number of plane reflecting facets equal to the number of lenses, each facet being located at the focal plane of an associated lens, and means for producing a light beam and for focusing said beam into a spot which intersects the focal planes of said lenses on said reflecting facets such that the beam of light will be reflected from each facet to its associated lens so that the principal axis of said lens is initially on one side of the beam, then coincident with it, and finally on the other side of the beam, whereby the angle scanned by the beam will comprise the angle through which the beam is deflected as the lens rotates through the angle it subtends plus the refractive angles produced by virtue of the initial and final off-axis positions of the beam with respect to the principal axis of the lens.

2. The system of claim 1 wherein said light beam focused into a spot is stationary.

3. The system of claim 1 including means for moving said light beam across the focal plane of each lens in a direction opposite to the direction of rotation of said disc, whereby the scanning rate of said system is increased.

4. The system of claim 3 wherein the means for moving said light beam includes lens means for focusing a stationary light beam onto said rotating facets, and stationary mirrors for directing the light beam reflected from said facets onto the facet spaced 180 with respect thereto, whereby the light beam on said facet spaced 180° with respect to the incident stationary beam will move across the facets in a direction opposite to the direction of rotation of said disc.

5. In an optical scanning system, a rotating disc, a plurality of spherical mirrors carried on said disc and spaced around its periphery in side-by-side relationship, pyramid means at the center of said disc and operatively connected thereto so as to rotate therewith, the sides of said pyramids defining a number of plane reflecting facets equal to the number of spherical mirrors, each facet being located at the focal plane of an associated one of said spherical mirrors, and means for producing a light beam and for focusing said beam into a spot which intersects the focal planes of said spherical mirrors on said reflecting facets such that the beam of light will be reflected from the facet to said spherical mirror so that the principal axis of said spherical mirror is initially on one side of the beam, then coincident with it, and finally on the other side of the beam, whereby the angle scanned by the beam will comprise the angle through which the beam is deflected as the spherical mirror rotates through the angle it subtends plus the reflective angles produced by virtue of the initial and final off-axis positions of the beam with respect to the principal axis of the spherical mirror.

6. The system of claim 5 wherein the optical axes of said mirrors are perpendicular to the axis of rotation of said rotating disc, and including a stationary mirror having an opening through which a light beam reflected from a facet passes, said stationary mirror serving to reflect light reflected from said circumferentially spaced mirrors out of the plane of the rotating assembly comprising said disc, said mirrors and the pyramid means.

7. The system of claim 6 wherein the axes of said mirrors spaced around the periphery of said disc are parallel to the rotational axis of said disc, and including a stationary mirror for reflecting a beam of light reflected from said facets onto said mirror spaced around the periphery of said disc.